US010025872B2

(12) United States Patent
Broomhall et al.

(10) Patent No.: US 10,025,872 B2
(45) Date of Patent: *Jul. 17, 2018

(54) MANAGING BROWSER TABS BASED ON UNIFORM RESOURCE LOCATORS

(71) Applicant: International Business Machines Corporation, Armonk, NY (US)

(72) Inventors: Matthew E. Broomhall, Goffstown, NH (US); Christopher R. Dotson, Lexington, KY (US); Fabrizio N. Caldas, Sumare (BR); Michael R. Spano, Sr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/462,095

(22) Filed: Mar. 17, 2017

(65) Prior Publication Data
US 2017/0185613 A1 Jun. 29, 2017

Related U.S. Application Data

(63) Continuation of application No. 14/817,239, filed on Aug. 4, 2015, now Pat. No. 9,703,887.

(51) Int. Cl.
*G06F 17/00* (2006.01)
*G06F 17/30* (2006.01)
*G06F 17/22* (2006.01)

(52) U.S. Cl.
CPC ...... *G06F 17/3089* (2013.01); *G06F 17/2235* (2013.01); *G06F 17/2247* (2013.01); *G06F 17/30876* (2013.01); *G06F 17/30899* (2013.01)

(58) Field of Classification Search
None
See application file for complete search history.

(56) References Cited

U.S. PATENT DOCUMENTS

| 7,681,144 B2 | 3/2010 | Keereepart et al. |
| 8,375,321 B2 | 2/2013 | Cruz Moreno et al. |
| 8,631,340 B2 | 1/2014 | Schreiner et al. |
| 9,110,568 B2 | 8/2015 | Jitkoff et al. |
| 9,569,412 B1 | 2/2017 | Broomhall et al. |

(Continued)

FOREIGN PATENT DOCUMENTS

| WO | 2008094371 A1 | 8/2008 |
| WO | 2011137186 A2 | 11/2011 |

OTHER PUBLICATIONS

Akimkin, "AutoGroup 0.3.1", Firefox Add-ons, Mar. 23, 2013, https://addons.mozilla.org/EN-us/firefox/addon/autogroup/, pp. 1-3.

(Continued)

*Primary Examiner* — Asher D Kells
(74) *Attorney, Agent, or Firm* — Michael A. Petrocelli

(57) ABSTRACT

A computer implemented method and system for managing browser tabs includes identifying a plurality of URLs (Uniform Resource Locator(s)) in response to detecting the URLs in a web browser running on a computer. The plurality of URLs are organized based on each of the URLs, and each of the plurality of URLs correspond to a tab opened by the web browser. The tabs of the web browser are grouped based on the URLs.

3 Claims, 3 Drawing Sheets

(56) References Cited

U.S. PATENT DOCUMENTS

| | | |
|---|---|---|
| 2008/0005686 A1* | 1/2008 | Singh .................. G06F 3/04842 715/764 |
| 2009/0327947 A1 | 12/2009 | Schreiner et al. |
| 2010/0070928 A1 | 3/2010 | Goodger et al. |
| 2011/0161828 A1 | 6/2011 | Sauve et al. |
| 2012/0131485 A1 | 5/2012 | Svendsen et al. |
| 2013/0086506 A1* | 4/2013 | Molander ............... G06F 3/048 715/777 |
| 2014/0365853 A1 | 12/2014 | Kleinhout et al. |
| 2015/0095847 A1 | 4/2015 | Kleinhout et al. |
| 2015/0205462 A1* | 7/2015 | Jitkoff .................. G06F 3/0483 715/777 |
| 2016/0048586 A1 | 2/2016 | Lipin et al. |
| 2016/0139750 A1* | 5/2016 | Barrus .................. G06F 3/0483 715/777 |

OTHER PUBLICATIONS

Pending U.S. Appl. No. 14/817,239, filed Aug. 4, 2015, entitled: "Auto Grouping Browser Tabs", pp. 1-24.

Akimkin, "AutoGroup 0.2", Aug. 20, 2011; Add-ons for Firefox; https://addons.mozilia.org/en-US/firefox/addon/autogroup.

IBM: List of IBM Patents or Patent Applications Treated as Related (Appendix P), Mar. 29, 2017, pp. 1-2.

Pending U.S. Appl. No. 15/462,128, filed Mar. 17, 2017, entitled: "Auto Grouping Browser Tabs", pp. 1-21.

\* cited by examiner

MANAGING BROWSER TABS BASED ON UNIFORM RESOURCE LOCATORS

BACKGROUND

The present disclosure relates to a method and system for organizing web browser tabs. A user of a web browser for searching on a computer device, such as a desktop computer, mobile device, laptop, or the like can have many tabs open simultaneously. For example, tabs within a browser can be opened as website are visited, or by opening links in emails or documents. A multiplicity of open tabs can be confusing to a user and cumbersome to manage. Also, having many tabs open can make it difficult to find a previously opened tab.

SUMMARY

According to an aspect of the present invention, a computer implemented method for managing browser tabs includes identifying a plurality of URLs (Uniform Resource Locator(s)) in response to detecting the URLs in a web browser running on a computer. The plurality of URLs are organized based on each of the URLs, and each of the plurality of URLs correspond to a tab opened by the web browser. The tabs of the web browser are grouped based on the URLs.

According to another aspect of the present invention, a computer program product manages browser tabs. The computer program product comprises a computer readable storage medium having program instructions embodied therewith, wherein the computer readable storage medium is not a transitory signal per se, and the program instructions are executable by a computer to cause the computer to perform a method, comprising: identifying a plurality of URLs (Uniform Resource Locator(s)) in response to detecting the URLs used by a web browser running on a computer; organizing the plurality of URLs based on the URLs, each of the plurality of URLs corresponding to a tab opened by the web browser; and grouping the tabs of the web browser based on the URLs.

According to another aspect of the present invention, a computer system manages browser tabs. The computer system comprises: one or more computer processors, one or more computer-readable storage media, and program instructions stored on one or more of the computer-readable storage media for execution by at least one of the one or more processors, wherein the program instructions, comprise: identifying a plurality of URLs (Uniform Resource Locator(s)) in response to detecting the URLs used by a web browser running on a computer; organizing the plurality of URLs based on the URLs, each of the plurality of URLs corresponding to a tab opened by the web browser; and grouping the tabs of the web browser based on the URLs.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are described hereinafter as follows.

DETAILED DESCRIPTION

Figure 1:
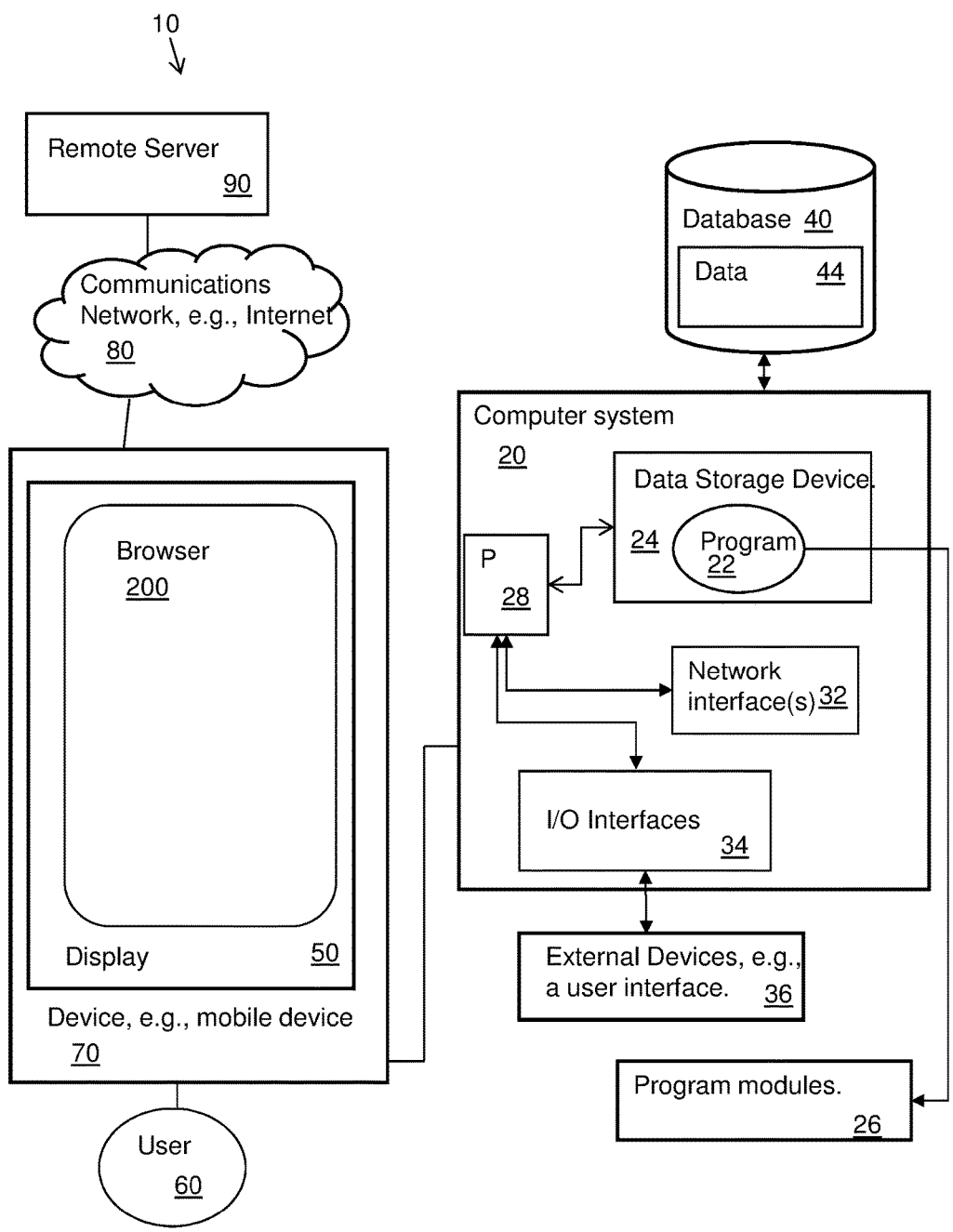
FIG. 1 is a schematic block diagram illustrating an overview of a system and methodology for managing browser tabs according to an embodiment of the disclosure.
Figures 2A, 2B:
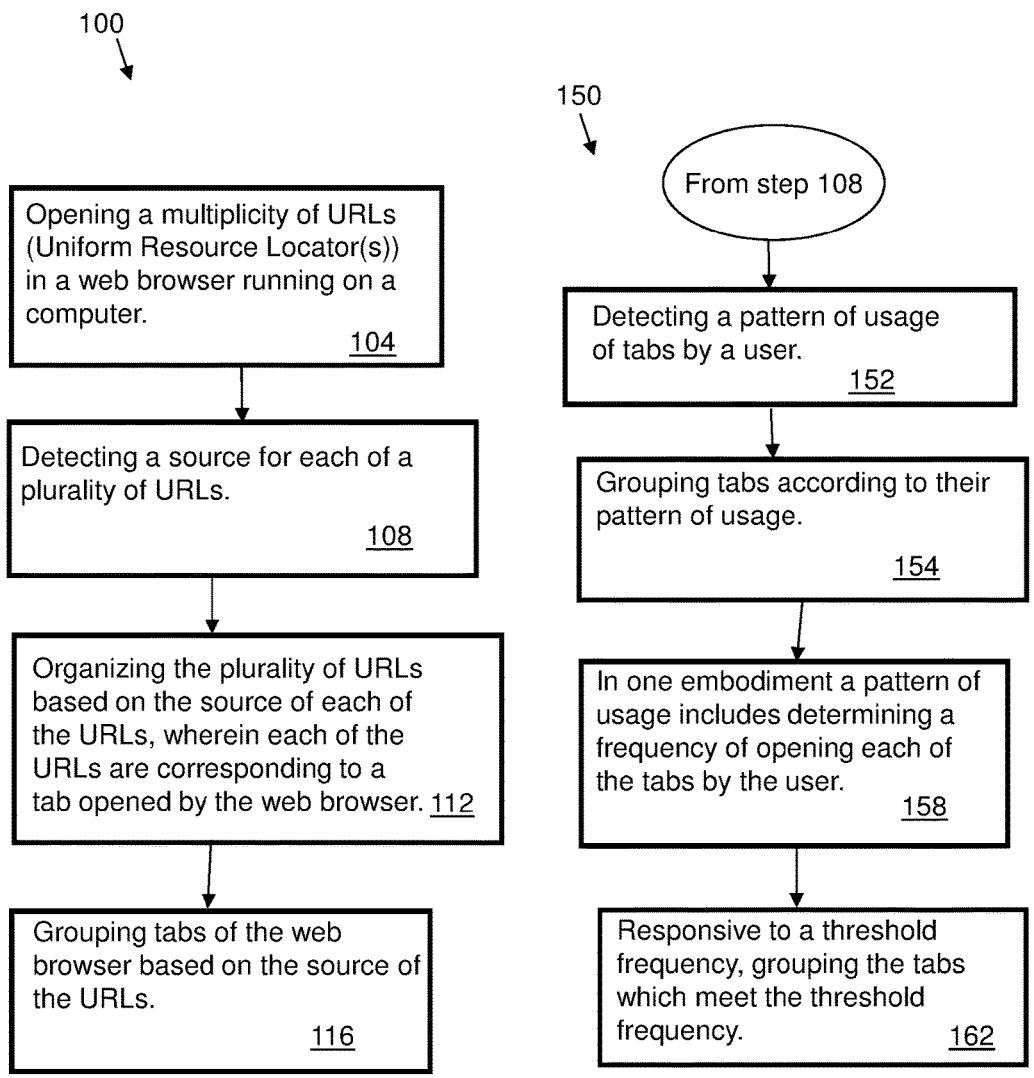
FIG. 2A is a flow chart illustrating a method for managing browser tabs based on FIG. 1 according to an embodiment of the disclosure based on detecting a source of a URL opened by a user.
FIG. 2B is a flow chart illustrating a method for managing browser tabs based on FIG. 2A according to an embodiment of the disclosure based on a pattern of usage by a user.

Referring to FIGS. 1 and 2A and 2B, a system 10 and method 100 according to an embodiment of the present disclosure manages browser tabs. A device 70 for opening a browser application includes a computer 20. The device 70 can be a mobile device, or other types of computer devices. The device includes a web browser or browser application 200 (e.g., a software application) for searching the Internet and accessing websites on the World Wide Web (WWW). The web browser 200 is viewable to a user 60 on a display 50 of the device 70.

In one embodiment of a method 100 according to the present disclosure, a multiplicity of URLs (Uniform Resource Locator(s)) are opened in a web browser running on the device 70, as in block 104 of FIG. 2A. In one instance, a user can open a multiplicity of tabs while using a browser on a computer. The tabs correspond to a plurality of URLs. The method can identify a plurality of URLs that are open in the browser, and organize the plurality of URLs based on each of the URLs by grouping the tabs based on the URLs. For instance, the URLs associated with the tabs can be the same in part or completely the same. The similarity can be used to group the tabs. The URLs can be parsed to identify the different parts of the URL, for instance, protocols, path, domains, servers, directories, folders, etc. Any of the parts of the URL can be used for identifying URLs and grouping the URLs.

More specifically, in one embodiment, the method 100 includes detecting a source for each of a plurality of URLs (Uniform Resource Locator(s)) in response to receiving the URLs in a web browser running on the device 70, as in block 108.

The device 70 may be a mobile device. A mobile device is one embodiment of a device having a computer or computer system 20, which is depicted generically in FIG. 1. Other devices having a computer or described as a computer or computer system may include, for example, a Personal Data Assistant (PDA), a cell phone, or a notebook, a desktop computer, or the like. The device in the present disclosure can be configured to send and receive electronic communications. The computer system 20 is a generic representation of a computer which may be embodied in a device such as a hand held device, or can also represent a server for providing the method of the present disclosure as a service which can be accessible using the Internet or a network.

The plurality of URLs are organized based on the source of each of the URLs, as in block 112. The source of the URLs can include a website or an email program that the URL originates from. The URL itself can indicate the source of the URL (as part of the URL) as the domain name or a specific webpage. Thus, the URL can describe the source or origin of the page a user is viewing.

Referring to FIG. 2A, the method 100 includes grouping the tabs of the web browser based on the source of the URLs, as in block 116. The source can be part of the URL as described above, and that part of the URL can be used to group a plurality of URLs, for instance, grouping all the URLs with the same location in the URL (e.g., which can be the source).

Figure 3:
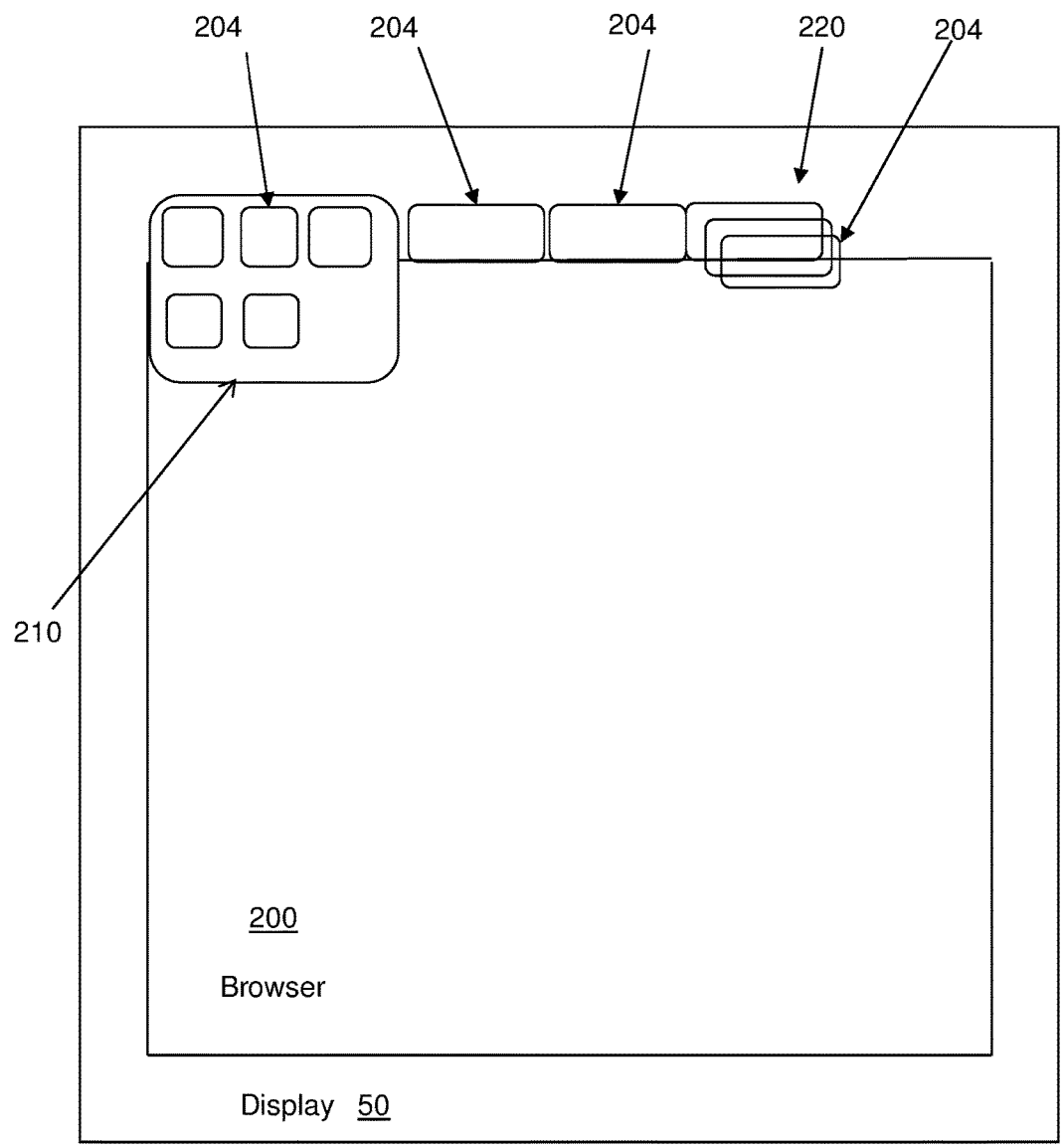
FIG. 3 is a schematic block diagram illustrating an interface of a device with a browser application having tabs, in an embodiment of the disclosure.

Referring to FIG. 3, each of the URLs correspond to a tab 204 opened by the web browser 200. The tabs 204 can be displayed by the web browser along the top of the web browser display, as shown in one embodiment at FIG. 3. The URL can be described as a referrer field which includes a referral point for each URL. The URL can provide a base referral point, for instance, at its beginning. The address of a displayed page in the URL can include, points or nodes, directories or files for displaying a page, as well as domains and protocols, any of which can be used to group the URLs.

The tabs 204 of the web browser are grouped under a group tab 210 based on the source of the URLs. For example, the tabs having URLs that are the same or variations of the same base URL are grouped under one group tab 210, as shown in FIG. 3. The group tab 210 can collapse and expand when selected to display the group of tabs 204 as shown in FIG. 3. Alternatively, the grouping of tabs can include a grouped sequence 220 of tabs 204 offset from one another, as shown in FIG. 3.

In one example, the URL can be broken down to a base or root, that is, the first part of the URL which includes a domain name can be referred to as the base part of the URL or the base URL. The URL also includes a specific web page. In one example the tabs which open in the browser and refer to the same domain name can be grouped together and may have different web page addresses. The URL can also include the protocol type, such as, http (Hypertext Transfer Protocol). In another example, tabs open in the web browser which have the same protocol types can be grouped together.

Referring to FIG. 2B, in another embodiment of a method 150 according to the present disclosure, following from blocks 104 and 108 of the method 100, a pattern of usage by a user using the tabs can be detected, as in block 152. In one example, the tabs can be identified by their source, as in block 108, so that a pattern of usage can be ascertained. The tabs for each of the URLs which fit the pattern of usage can be grouped together, as in block 154.

For example, a pattern of usage can include a frequency threshold established for opening tabs. If tabs are opened by a user an amount of times meeting this threshold, the tabs can be grouped together. Thus, a pattern of usage can include determining a frequency of opening for each of the tabs by the user, as in block 158. The threshold frequency can be established, and the tabs can be grouped which meet the threshold frequency, as in block 162. The threshold frequency can be a minimum frequency so that if the frequency of the tabs being opened meets or exceeds the threshold, the tabs are grouped together.

In another example, a pattern of usage includes detecting manual movements of tabs by a user. A pattern of manual movement of tabs can include moving tabs into a group, or from one group to another. For instance, a pattern can include tabs being moved into a group where the URLs associated with the tabs are similar or have a common part of a URL. The method and system of the present disclosure can record the grouping of the tabs as a pattern or a default, and then automatically group the tabs as established by the pattern.

In another example, the method can detect a length of time a tab is open, and move tabs meeting or exceeding a threshold time into a group. The threshold time can be a determined or predetermined period of time.

The method and system of the present disclosure can be an application for a mobile device, a desktop computer, or be available as an online service. An advantage of the method and system of the present disclosure includes improving browser tab organization. Also, the method and system of the present disclosure facilitates a user's ability to find resources. The method and system of the present disclosure provides an advantageous technique for grouping tabs that facilitates organization and thereby improves efficiency for a user.

In general, one embodiment of the present disclosure recognizes a referral point for each URL of a tab, and organizes the tabs with common sources into groups. For example, a feed reader stream delivering content from a specific source delivers URL references. When a URL referral source can be determined, the method and system of the present disclosure optimizes the organization of browser tabs by grouping the tabs together from the same referral source. Thus, the method and system detects the source for the URL and subsequently establishes a common source point for other URLs to be grouped as tabs. The source can also be an application with an embedded link, such as an email application, or a messaging system. In this situation, the source would be the email application or messaging system and the tabs can be groups accordingly, that is, according to the same email application or messaging system (e.g., the initiating program). An embedded link can also be part of a document, or a message with an embedded link. In this situation, the source can be considered as the document or the message, and the tabs can be organized according to the same source.

Using the present disclosure, a user can receive multiple information feeds throughout the course of each work day. Each of the information feeds can be from a different origin. The user can open multiple links from the incoming information which directly or indirectly opens tabs in a web browser. The method and system of the present disclosure can be activated on the launch of each link corresponding to a browser tab. In one embodiment, the origin of the feed can be captured, or, in other words, the source of the feed or link is captured, and the tabs group according to their source.

For each opened link, the system can check the browser tabs from all of the previously opened links. If there is a prior tab from the same source, the two or more tabs can be grouped together. The name of the source can be the default name of a group tab, with tabs within the group representing the websites. If the user moves links from one tab to another, or groups tabs together, the method and system can detect patterns in manual movement. Once a pattern is established, the method and system can use the pattern as a default for additional link launches from the same source to be grouped according to the pattern.

In one embodiment according to the present disclosure, the method 100 may be embodied in a program 22 (FIG. 1) embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program. The method of the present disclosure can be run locally on a device such as the mobile device, or can be run a service, for instance, on a remote server 90 which is accessed using the communications network 80.

It is understood that a computer or a program running on the computer may communicate with a server computer via a communications network. The communications network may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A computer program product for managing browser tabs, the computer program product comprising a computer readable storage medium having program instructions embodied therewith, wherein the computer readable storage medium is not a transitory signal per se, the program instructions executable by a computer to cause the computer to perform a method, comprising:

identifying a plurality of URLs (Uniform Resource Locator(s)) in response to detecting the URLs used by a web browser running on a device including a computer, a source of the URLs being selected from a group consisting of: a website, an email program, and a document, the computer having a computer readable storage medium having program instructions embodied therewith, and the program instructions being executable by the computer, the device including one or more of: a mobile device, a desktop computer, and a server, the device and the web browser connecting to the Internet to connect to and access websites;

organizing the plurality of URLs based on the URLs, each of the plurality of URLs corresponding to a tab opened by the web browser;

grouping the tabs of the web browser based on the URLs, the grouped tabs including at least part of a same URL;

identifying a source for each of the plurality of URLs in response to receiving the URLs in the web browser running on the device, the source of the URLs being selected from a group consisting of: the website, the email program, and the document;

organizing the plurality of URLs based on the source of each of the URLs;

identifying a source for each of the plurality of URLs in response to using the URLs by the web browser running on the computer and initiating a tab;

identifying a source for each of a plurality of links in response to using the link to initiate a URL and a tab by the web browser running on the computer;

determining a protocol type, a domain name, and a specific web page for each the plurality of URLs;

grouping the tabs with the same domain name and the same protocol type;

displaying the group of tabs along a top of a web browser display, for display on a display of the device, the group of tabs being grouped under a group tab;

detecting a pattern of usage including setting a frequency threshold for opening the tabs by a user; and grouping a plurality of open tabs together in response to the tabs being opened by the user an amount of times meeting or exceeding the frequency threshold;

detecting a pattern of usage by a user initiating the URLs used by the web browser resulting in the plurality of open tabs, the pattern of usage including:

detecting a pattern of manual movement by the user for the plurality of open tabs, which includes detecting when the user groups tabs together, and moves a tab from one group to another group; and automatically grouping the tabs of the web browser based on the pattern of usage including the pattern of manual movement by:

grouping together a plurality of tabs from a same source;

grouping together a plurality of tabs based on the source and the pattern of manual movement which includes the user manually grouping tabs together; and using the pattern of manual movement as a default for grouping of tabs and additional link launches from the same source to be grouped according to the pattern.

2. The computer program product of claim 1, further comprising:

detecting a length of time a tab is open, the tab being part of a group of open tabs; and moving the open tabs into a group in response to the tabs meeting or exceeding a threshold time open, the threshold time being a predetermined period of time.

3. The computer program product of claim 1, further comprising:

detecting a pattern of manual movement by the user for the plurality of open tabs being opened by the user, including detecting when the user moves a link from a source from one group to another group, and when the user manually groups tabs together; and grouping together another link from the source, and another tab related to previously grouped tabs, based on the pattern of manual movement.

* * * * *